US008290134B2

(12) United States Patent
Jaiswal et al.

(10) Patent No.: US 8,290,134 B2
(45) Date of Patent: Oct. 16, 2012

(54) MANAGING CONFERENCE CALLS VIA A TALK QUEUE

(75) Inventors: Peeyush Jaiswal, Boca Raton, FL (US);
Naveen Narayan, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 1148 days.

(21) Appl. No.: 11/828,677

(22) Filed: Jul. 26, 2007

(65) Prior Publication Data

US 2009/0028316 A1    Jan. 29, 2009

(51) Int. Cl.
*H04M 3/56* (2006.01)
(52) U.S. Cl. .............. 379/202.01; 379/201.01
(58) Field of Classification Search ............. 379/202.01, 379/377, 201.01, 266.01; 709/207
See application file for complete search history.

(56) References Cited

U.S. PATENT DOCUMENTS

| | | | |
|---|---|---|---|
| 6,178,237 B1 * | 1/2001 | Horn | 379/202.01 |
| 7,849,044 B2 * | 12/2010 | Nelken | 706/55 |
| 2004/0105535 A1 * | 6/2004 | Gross et al. | 379/201.01 |
| 2004/0158614 A1 * | 8/2004 | Williams | 709/207 |
| 2005/0152523 A1 * | 7/2005 | Fellenstein et al. | 379/202.01 |
| 2005/0259809 A1 * | 11/2005 | Hodge | 379/377 |
| 2006/0084455 A1 * | 4/2006 | Schwagmann et al. | 455/518 |
| 2006/0222155 A1 * | 10/2006 | Summers et al. | 379/202.01 |
| 2006/0256956 A1 * | 11/2006 | Lee et al. | 379/266.01 |
| 2007/0105579 A1 * | 5/2007 | Shaffer et al. | 455/519 |
| 2007/0121872 A1 * | 5/2007 | Hans et al. | 379/202.01 |

* cited by examiner

*Primary Examiner* — Yuwen Pan
*Assistant Examiner* — Phan Le
(74) *Attorney, Agent, or Firm* — Yudell Isidore Ng Russell PLLC

(57) ABSTRACT

A method of and system for managing a conference call among participants and a moderator provides a control mode in which only one participant can speak at time. All participants other than the speaker are muted. The system maintains a talk queue. When a participant requests to speak, the system places the participant in the talk queue. The system may announce to the moderator that the participant has registered to speak. The system may also announce to the moderator the participant's position in the talk queue. When a speaking participant relinquishes, or is preempted from, the speaking position, the system mutes the speaking participant. The system informs the participant at the top of the talk queue that it is his or her turn to speak and unmutes that participant, whereby that participant becomes the new speaking participant. The system removes the new speaking participant from the talk queue. The system may announce their respective positions to the other participants in the talk queue. The system may include priority codes. If a participant enters a priority code when he or she requests to speak, the system places the participant at the top of the talk queue. If the participant does not enter a priority code, the system places the participant at the bottom of the talk queue.

19 Claims, 4 Drawing Sheets

MANAGING CONFERENCE CALLS VIA A TALK QUEUE

BACKGROUND OF THE INVENTION

1. Technical Field

The present invention relates generally to the field of telecommunications, and more particularly to a method of and system for managing conference calls.

2. Description of the Related Art

Conference calls provide a popular and convenient way in which to hold meetings. Rather than meeting in person, conference call participant attend the meeting by telephone. Conference calls allow participants to participate in meetings virtually anywhere in the world.

One way of establishing a conference call is by means of a conference bridge. Conference call invitees are given a telephone number to reach the bridge and an access code that identifies the conference. The conference bridge conferences together the callers who have called into the conference and performs some conference call management functions. The conference call management functions performed by the conference bridge typically are limited to receiving calls at the beginning of the conference, conferencing together the participants, and terminating call at the end of the conference.

Current conference call systems lack some of the advantages of face-to-face meetings. Since the participants cannot see each other, they do not receive visual cues that aid in controlling face-to-face meetings. For example, participants do not know when another participant is going to start speaking. Also, participants cannot signal the moderator their desire to speak and the moderator cannot recognize a participant as a next speaker.

SUMMARY OF THE INVENTION

The present invention provides a method of and system for managing a conference call among participants and a moderator. The system provides a control mode in which the system allows only one participant to speak at time. The lines of all participants other than the speaker are muted. The system maintains a talk queue. When a participant requests to speak, the system places the participant in the talk queue. The system may announce to the moderator that the participant has registered to speak. The system may also announce to the moderator the participant's position in the talk queue.

When a speaking participant relinquishes, or is preempted from, the speaking position, the system mutes the speaking participant's line. The system informs the participant at the top of the talk queue that it is his or her turn to speak and unmutes that participant's line, whereby that participant becomes the new speaking participant. The system removes the new speaking participant from the talk queue. The system may announce their respective positions to the other participants in the talk queue.

Embodiments of the present invention may include priority codes. If a participant enters a priority code when the participant requests to speak, the system places the participant at the top of the talk queue. If the participant does not enter a priority code, the system places the participant at the bottom of the talk queue.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
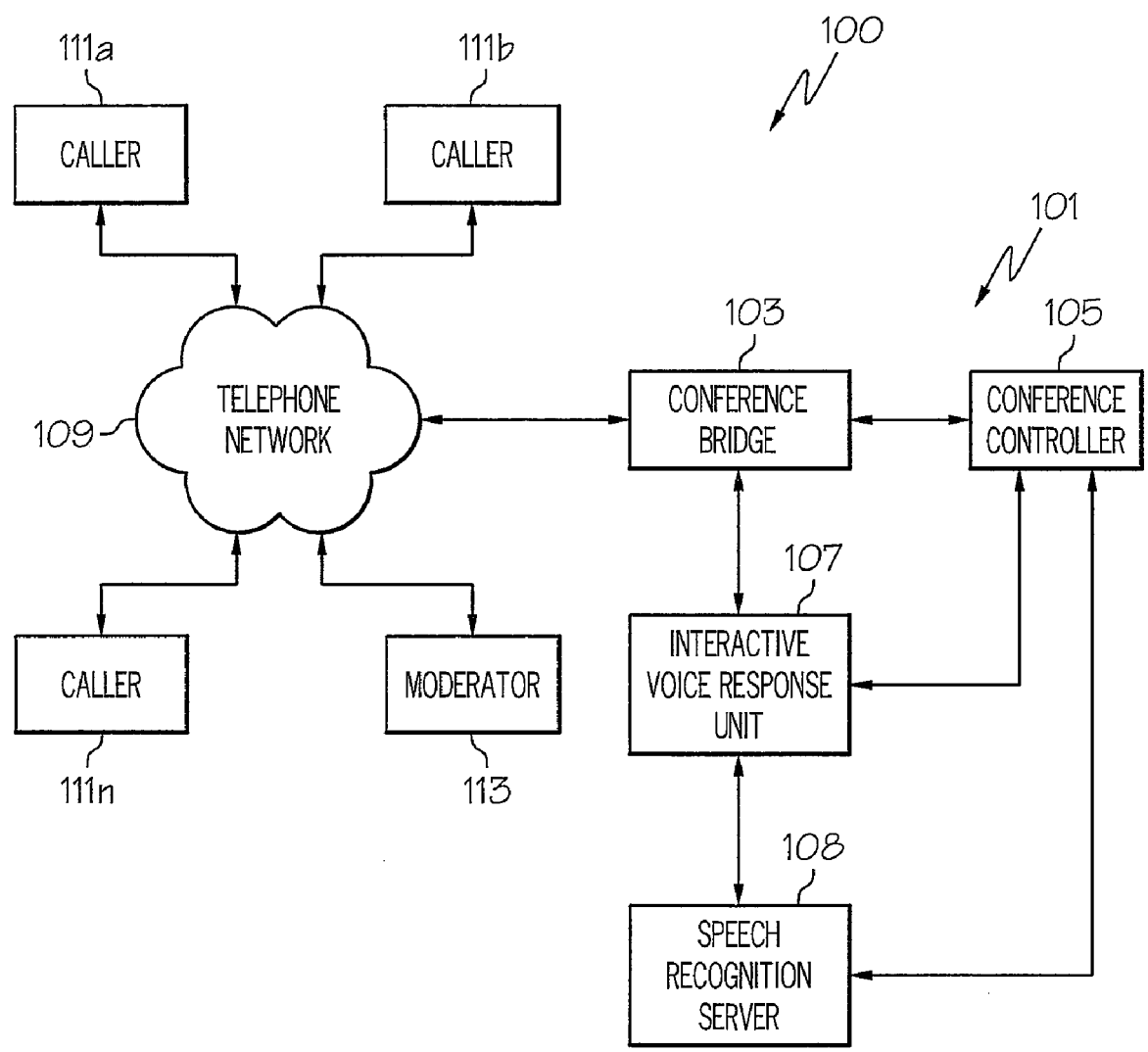
FIG. 1 is a block diagram of an embodiment of a system according to the present invention.

Referring now to the drawings, and first to FIG. 1, a system according to the present invention is designated generally by the numeral 100. System 100 includes a conference call platform 101, which includes a conference bridge 103, a conference controller 105, an interactive voice response (IVR) unit 107, and a voice recognition server 108. Conference bridge 103 is coupled to a telephone network, indicated generally at 109. Telephone network 109 may include a public switched telephone network, an Internet telephone network, a private telephone network, or any other telephone network. A plurality of callers 111 are coupled to telephone network 109. A moderator 113 is also coupled to telephone network 109. As will be explained in detail hereinafter, conference call platform 101 enables callers 111 and moderator 113 to participate in conference calls according to the present invention.

Figure 2:
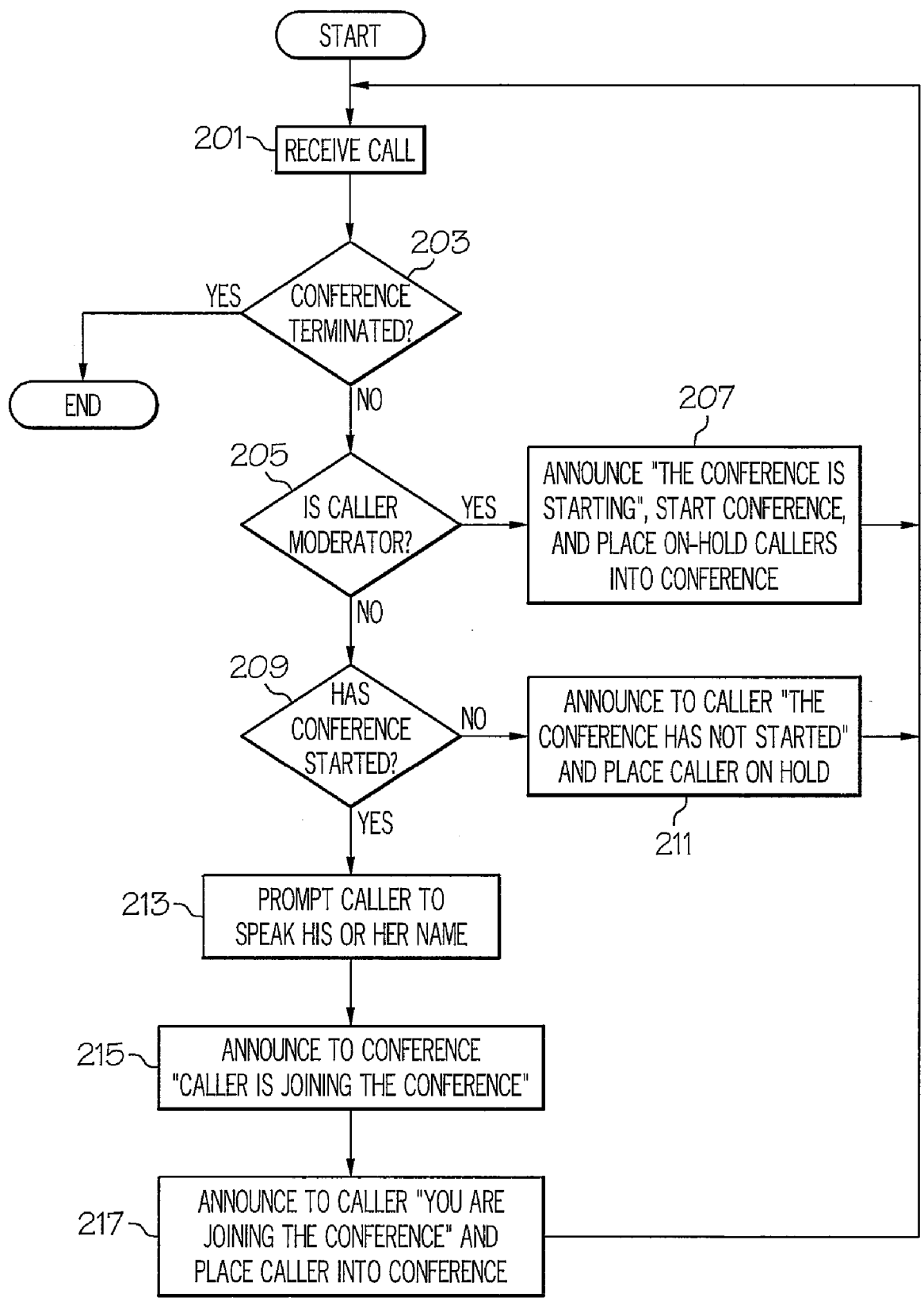
FIG. 2 is a flow chart of conference call initiation and termination processing according to an embodiment of the present invention.

FIG. 2 is a flow chart of conference call set up processing according to the present invention. The system receives a call, as indicated at block 201. The system determines, at decision block 203, if the conference is terminated. If so, processing ends. If the conference is not terminated, the system determines, at decision block 205, if the caller is the moderator. If so, the system announces to any on-hold callers that the conference is starting, starts the conference, and places any on-hold callers into conference, as indicated at block 207. Then, processing returns to block 201. If, as determined at decision block 205, the caller is not the moderator, the system determines, at decision block 209, if the conference has started. If not, the system announces to the caller that the conference has not started and places the caller on hold, as indicated at block 211. If the conference has started, the system prompts the caller to speak his or her name, at block 213. Then, the system announces to the conference that the caller is joining the conference, at block 215. The system announces to the caller that he or she is joining the places the caller into the conference, as indicated at block 215. Conference call set up processing according to FIG. 2 continues until the conference is terminated.

Figure 3:
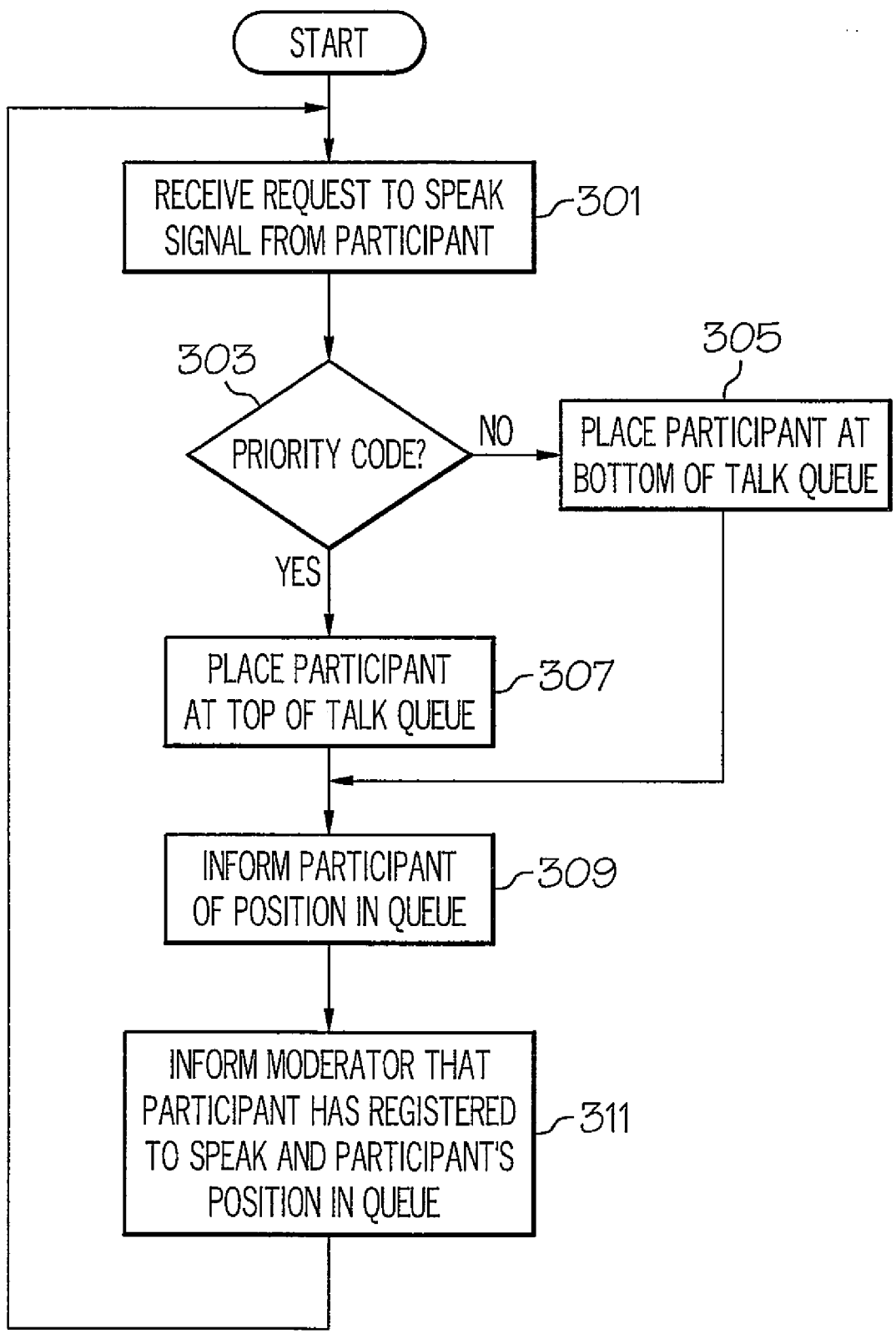
FIG. 3 is a flow chart of conference call participant queuing according to an embodiment of the present invention; and, FIG. 4 is a flow chart of caller queue processing according to an embodiment of the present invention.

FIG. 3 is a flow chart of conference call participant queuing according to an embodiment of the present invention. The system receives a request to speak signal from a participant, as indicated at block 301. A request to speak signal may comprise a sequence of DTMF tones. The system determines, at decision block 303, if the request to speak signal includes a priority code. A priority code may comprise an additional sequence of DTMF tones. Certain participants in the conference call may be given priority codes so that they may obtain higher priority in the call participant queue. If, as determined at decision block 303, the participant has not entered a priority code, the system places the participant at the bottom of the talk queue, as indicated at block 305. If, as determined at decision block 303, the participant has entered a priority code, then the system places the participant at the top of the talk queue, as indicated at block 307. Then, the system informs the caller of his or her position in the queue, as indicated at block 309. The system may inform the caller of his or her position using a whisper tone or other low-volume announcement so as not to drown out anyone who is currently speaking in the conference. Then, the system informs the moderator that the participant has registered to speak and the participant's position and the queue, as indicated at block 311. Again, the system may inform the moderator using a whisper tone.

It should be recognized that caller queuing according to FIG. 3 is only an example of an embodiment of the present invention. Participants may be placed in and rotated through a queue in a simple round robin fashion. Additionally, participants requesting to speak may be queued according to an organizational hierarchy.

Figure 4:
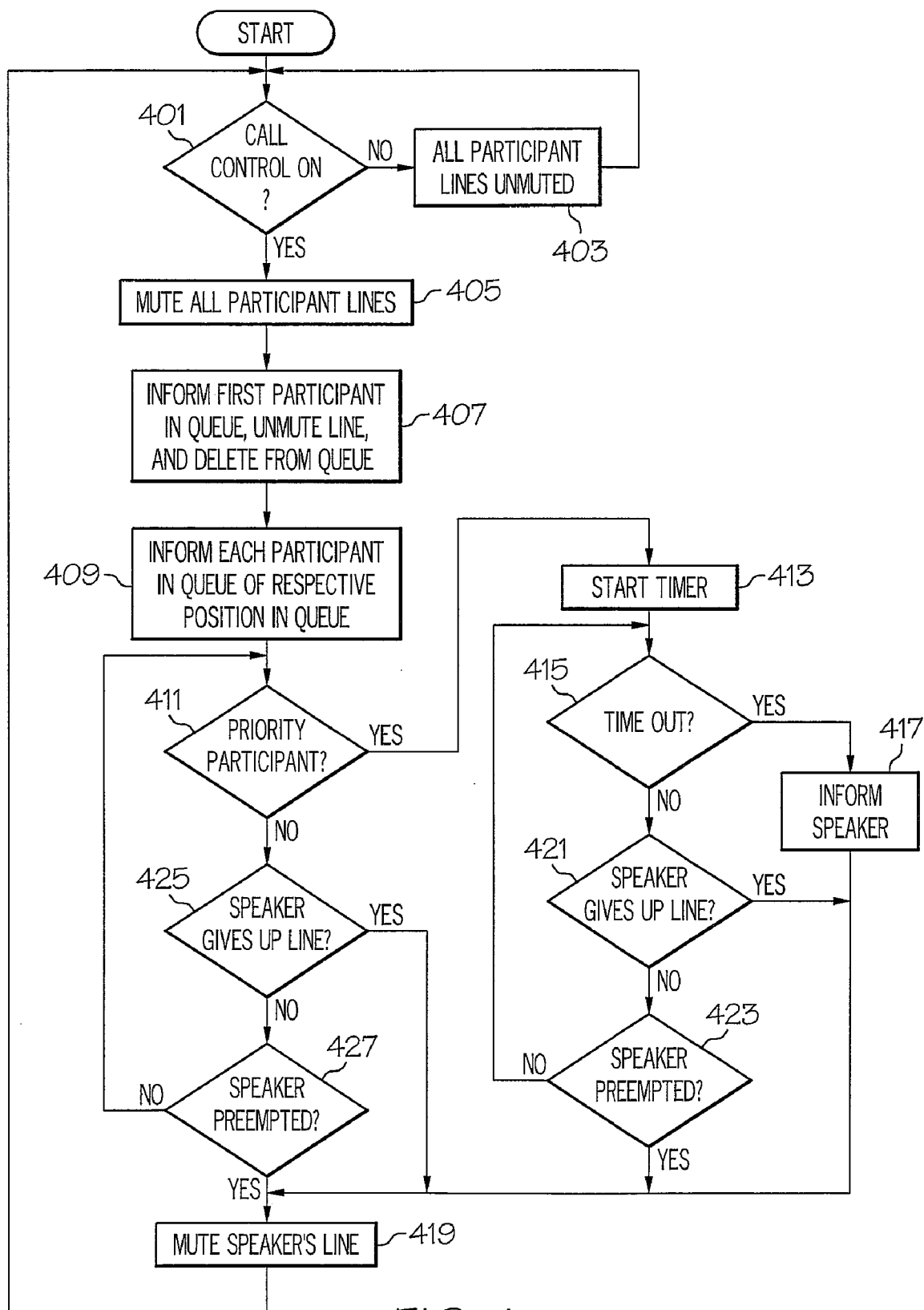

FIG. 4 is a flow chart of participant queue processing according to an embodiment of the present invention. The system determines, at decision block 401, in call control is on. The moderator can turn on call control by entering a sequence of DTMF tones, such as #*. The moderator can turn off call control by entering a second string of DTMF tones such as #**, or the moderator can toggle back and forth between call control on and call control off by enter #* or some other code. If call control is not on, all participant lines are unmuted, as indicated at block 403.

If, as determined at decision block 401, call control is on, the system mutes the lines of all the participants, as indicated at block 405. When the participants' lines are muted, they hear the conference but they cannot speak. Then, the system informs the first participant in the queue that is his or her turn to speak, unmutes the first participant's line, and deletes the first participant from the queue, all as indicated at block 407. The system may inform each participant in the queue of his or her respective position, at block 409. The system may inform each participant using a whisper tone. The system determines, at decision block 411, if the participant that has just been given the speaker's position has entered a priority code. Since the speaker may have been given priority in the conference, an embodiment of the present invention may give the speaker only a limited time in which to speak. Accordingly, if, as determined at decision block 411, the speaker has entered a priority code, the system starts a timer, as indicated at block 413. The system determines, at decision block 415, if the timer has timed out. If so, the system informs the speaker, preferably by whisper tone announcement, that his or her time is up, as indicated at block 417. Then, the system mutes the speakers line, at block 419, and processing returns to decision block 401 If, as determined at decision block 415, the timer has not timed out, the system determines, at decision block 421, if the speaker has given up line. The speaker may give up the line by entering a DTMF sequence or by making a verbal announcement. Alternatively, the system may determine that the speaker has given up the line by detecting a predetermined period of silence. If, as determined at decision block 417, the speaker has given up the line, then the speaker's line is muted, at block 419, and processing returns to decision block 401. If, as determined at decision block 421, the speaker has not given up the line, the system determines, at decision block 423, if the speaker has been preempted. Embodiments of the present invention may allow the moderator of the call to preempt a speaker at by entering a sequence of DTMF tones. Processing continues to loop through decision blocks 415, 421, and/or 423, until the timer times out, or the speaker gives up the line or is preempted.

Returning to decision block 411, if the participant has not entered a priority code, then the system determines, at decision block 423, if the speaker has given up the line. Again, the speaker may give up the line by entering a DTMF sequence or by announcing that he or she is giving up the line or the system may detect a period of silence. If so, the system mutes the speaker's line, at block 419, and processing returns to decision block 401. If the speaker has not given up the line, the system determines, at decision block 427, if the speaker has been preempted. Again, the moderator may preempt a speaker by entering a predetermined sequence of DTMF tones. If so, the system mutes the speaker's line, at block 419, and processing returns to decision block 401.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of managing conference calls among a plurality of participants and a moderator by a system, each of said participants being associated with a line, which method comprises:
   said system placing said plurality of participants into a conference call;
   said system muting the line associated with each of said plurality of participants on said conference call;
   receiving a request to speak from a first participant of said plurality of participants;
   placing said first participant at a position in a talk queue, said talk queue having at least a top position and a bottom position;
   determining if said first participant has entered a priority code, wherein when entered by a participant, said priority code assigns a higher priority in said talk queue to said participant;
   in response to determining said first participant has entered said priority code, placing said first participant at said top position in said talk queue;
   in response to determining said first participant has not entered said priority code, placing said first participant at said bottom position in said talk queue; and
   selecting, from said talk queue, a participant at said top position of said talk queue; and
   in response to selecting said participant at said top position of said talk queue:
      deleting said participant at said top position of said talk queue;
      setting said participant at said top position of said talk queue as a speaker; and
      unmuting said line associated with said speaker, thereby giving said speaker a turn to speak and to be heard by said plurality of participants on the conference call;
      wherein a line for each of said plurality of participants who is not said speaker remains muted.

2. The method as claimed in claim 1, further comprising:
   announcing to said moderator that said first participant has registered to speak; and
   announcing to said moderator said first participant's position in said talk queue.

3. The method as claimed in claim 1, further comprising:
   determining if said speaker has relinquished said line assigned to said speaker and if said first participant is in said top position in said talk queue; and in response to said speaker having relinquished said line assigned to said speaker and said first participant being in said top position in said talk queue:
informing said first participant that it is said first participant's turn to speak; and
setting said first participant as the speaker.

4. The method as claimed in claim 3, further comprising:
maintaining said speaker's line unmuted until said speaker relinquishes said first participant's turn to speak; and
in response to detecting said speaker has relinquished the speaker's turn to speak, muting said speaker's line.

5. The method as claimed in claim 3, further comprising:
maintaining said speaker's line unmuted until said speaker is preempted; and
muting said speaker's line in response to said speaker being preempted.

6. The method as claimed in claim 3, further comprising:
maintaining said speaker's line unmuted until a pre-set time expires; and
muting said speaker's line in response to said pre-set time expiring.

7. The method as claimed in claim 3, further comprising:
informing a next participant in said talk queue of said next participant's position in said talk queue after removing said first participant from said talk queue.

8. A method of managing a conference call among a plurality of participants and a moderator, each of said participants being associated with a line connected to a conference bridge, which method comprises:
placing said plurality of participants into a conference call;
determining if a call control has been turned on;
in response to determining said call control has been turned on, muting said lines of all of said plurality of participants in response to a call control command at said conference bridge;
receiving a request to speak from a first participant of said plurality of participants;
placing each participant, including said first participant, who requests to speak within a talk queue having at least a top position and a bottom position;
determining if said first participant has entered a priority code, wherein when entered by a participant, said priority code assigns a higher priority in said talk queue to said participant;
in response to determining said first participant has entered said priority code, placing said first participant at said top position in said talk queue;
in response to determining said first participant has not entered said priority code, placing said first participant at said bottom position in said talk queue;
selecting, from said talk queue, a participant at said top position of said talk queue; and
in response to selecting said participant at said top position of said talk queue:
deleting said participant at said top position of said talk queue;
setting said participant at said top position of said talk queue as a speaker; and
unmuting only a line associated with to said speaker, thereby giving said speaker a turn to speak and to be heard by said plurality of participants on the conference call while maintaining all other participant lines assigned to said plurality of participants in a muted state.

9. The method as claimed in claim 8, further comprising:
determining if a speaker has given up said line assigned to said speaker and if said first participant is in said top position in said talk queue; and
in response to determining that said speaker has relinquished said line assigned to said speaker and that said first participant is in said top position in said talk queue:
informing said first participant that it is said first participant's turn to speak; and
setting said first participant as the speaker.

10. The method as claimed in claim 9, further comprising:
receiving a request to speak from a second participant;
placing said second participant at a position in said talk queue; and
informing said moderator that said second participant has registered to speak.

11. The method as claimed in claim 9, further comprising:
determining when said speaker has relinquished said speaker's turn to speak, wherein said speaker relinquishes said turn to speak by at least one of:
detecting entering a sequence of dual-tone multi-frequency (DTMF) tones by said speaker;
receiving a verbal announcement by said speaker to relinquish said speaker's turn to speak;
detecting a period of silence by said speaker during said speaker's turn to speak; and
detecting a limited time for said speaker to speak has expired;
in response to detecting said speaker has relinquished said speaker's turn to speak, muting said speaker's line.

12. A conference call system, which comprises:
a conference call platform having a conference bridge that enables conferencing a plurality of participants and a moderator on a single conference call, each of said plurality of participants being associated with a line;
one or both of a conference controller and an interactive voice response (IVR) unit that:
places said plurality of participants into a call;
in response to detecting receipt of an input from a moderator device to activate a call control feature:
turns on the call control feature; and
selectively mutes all lines of the participants on the conference, wherein all participant lines are unmuted when call control is not turned on;
maintains a talk queue of one or more participants desiring to speak during said conference call, said talk queue having at least a top position and a bottom position;
receives one or more requests to speak on said conference call from at least a first participant of said plurality of participants;
responsive to receiving the request to speak from said first participant, places an identifier of the first participant in said talk queue;
determining if said first participant has entered a priority code, wherein when entered by a participant, said priority code assigns a higher priority in said talk queue to said participant;
in response to determining said first participant has entered said priority code, places said first participant at said top position in said talk queue;
in response to determining said first participant has not entered said priority code, places said first participant at said bottom position in said talk queue;
selects, from said talk queue, a participant at said top position of said talk queue;

in response to selecting said participant at said top position of said talk queue:
    deletes said participant at said top position of said talk queue;
    sets said participant at said top position of said talk queue as a speaker; and
    unmutes only a line associated with said speaker, thereby giving said speaker a turn to speak and to be heard by said plurality of participants on the conference call while maintaining all other participant lines associated with said plurality of participants in a muted state;
determines if (a) said speaker has given up said line assigned to said speaker and (b) said first participant is in said top position in said talk queue;
in response to detecting that said speaker has given up said line and said first participant is in said top position in said talk queue:
    informs said first participant in the queue of said first participant's turn to speak, wherein said conference call system informs each participant using a whisper tone;
    sets said first participant as the speaker,
    provides only a limited time to said speaker in which to speak;
    removes said speaker from said talk queue;
    unmutes said line associated with said speaker, thereby giving said speaker a turn to speak to and be heard by said plurality of participants on the conference call;
    detects when said speaker has relinquished said turn to speak, wherein said speaker relinquishes said turn to speak by at least one of:
        entering a sequence of dual-tone multi-frequency (DTMF) tones;
        making a verbal announcement to relinquish said speaker's turn to speak;
        detecting a period of silence by said speaker during said speaker's turn to speak; and
        detecting said limited time has expired; and
    in response to detecting said speaker has relinquished said speaker's turn to speak, muting said line associated with said speaker.

13. The method of claim 9, further comprising:
informing said first participant of a current position within said talk queue by providing one of a whisper tone and a low-volume announcement that does not drown out said currently speaking participant; and
informing said moderator that said first participant has registered to speak by providing said moderator with said current position of said first participant, wherein said moderator is informed via a whisper tone.

14. The method of claim 1, wherein said request to speak comprises a sequence of dual-tone multi-frequency (DTMF) tones.

15. The method of claim 1, wherein said priority code comprises an additional sequence of DTMF tones.

16. The method of claim 1, further comprising placing said plurality of participants within said talk queue relative to other participants already placed in the talk queue, wherein said plurality of participants requesting to speak are queued in said talk queue according to an organizational hierarchy.

17. The method of claim 1, further comprising:
in response to detecting receipt of an input from a moderator device to activate a call control feature, turning on said call control feature and muting all lines of said plurality of participants on the conference, wherein all lines of said plurality of participants are unmuted when call control is not turned on; and
informing, using a whisper tone, said selected participant in the talk queue that the selected participant is the currently speaking participant and it is their turn to speak.

18. The method of claim 1, further comprising:
in response to said first participant entering said priority code and said first participant becoming said speaker:
    starting a timer;
    determining when said timer has timed out;
    in response to determining said timer has timed out:
        informing said speaker, via a whisper tone announcement, that said speaker's turn to speak is over; and
        muting said line associated with said speaker;
    determining when said speaker relinquishes the line prior to the timer timing out by detecting one or more of:
        an entry by the speaker of one or more of a DTMF sequence to relinquish said line assigned to said speaker;
        said speaker making a verbal announcement to relinquish said line assigned to said speaker; and
        a period of silence on said line assigned to said speaker; and
    in response to determining that said speaker has relinquished said line associated with said speaker, muting said line associated with said speaker.

19. The method of claim 1, further comprising:
determining whether said speaker has been preempted via entry of a predetermined sequence of DTMF tones by said moderator; and
in response to determining said speaker has been preempted, muting said line associated with said speaker.

\* \* \* \* \*